(12) United States Patent
Jasper

(10) Patent No.: US 9,797,350 B2
(45) Date of Patent: Oct. 24, 2017

(54) FUEL SYSTEM AND COMPONENTS

(71) Applicant: Frank Raymond Jasper, Perth (AU)

(72) Inventor: Frank Raymond Jasper, Perth (AU)

( * ) Notice: Subject to any disclaimer, the term of this patent is extended or adjusted under 35 U.S.C. 154(b) by 387 days.

(21) Appl. No.: 14/508,505

(22) Filed: Oct. 7, 2014

(65) Prior Publication Data

US 2015/0059178 A1 Mar. 5, 2015

Related U.S. Application Data

(63) Continuation of application No. 14/016,482, filed on Sep. 3, 2013, now Pat. No. 8,881,711.

(51) Int. Cl.
| | | |
|---|---|---|
| *F02M 31/04* | (2006.01) | |
| *F02M 31/087* | (2006.01) | |
| *F02M 31/16* | (2006.01) | |
| *F02M 31/093* | (2006.01) | |
| *B23P 15/26* | (2006.01) | |
| *F01N 5/02* | (2006.01) | |
| *F28D 9/00* | (2006.01) | |
| *F28D 21/00* | (2006.01) | |

(52) U.S. Cl.
CPC ............. *F02M 31/16* (2013.01); *B23P 15/26* (2013.01); *F01N 5/02* (2013.01); *F02M 31/042* (2013.01); *F02M 31/087* (2013.01); *F02M 31/093* (2013.01); *F28D 9/0062* (2013.01); *F28D 2021/008* (2013.01); *Y02T 10/126* (2013.01); *Y10T 29/4935* (2015.01); *Y10T 29/49393* (2015.01)

(58) Field of Classification Search
CPC .... F02M 31/16; F02M 31/042; F02M 31/087; F02M 31/093; F01N 5/02; B23P 15/26; B21D 53/022; F28D 9/0062
See application file for complete search history.

(56) References Cited

U.S. PATENT DOCUMENTS

| 1,589,758 A | 6/1926 | Hogg | |
|---|---|---|---|
| 2,888,001 A | 5/1959 | Morrish | |
| 3,186,394 A * | 6/1965 | Ramun | ..................... F01N 5/00 |
| | | | 123/522 |

(Continued)

FOREIGN PATENT DOCUMENTS

| EP | 1243759 | 9/2002 |
|---|---|---|
| JP | 2005049066 | 2/2005 |
| JP | 2005147480 | 6/2005 |

OTHER PUBLICATIONS

Official action dated Jul. 5, 2016 issued in European Patent Application No. 14841464.2.

(Continued)

*Primary Examiner* — Jacob Amick
(74) *Attorney, Agent, or Firm* — Baker & McKenzie LLP

(57) ABSTRACT

A fuel system includes an internal combustion engine, a fuel device and a heat exchanger. The internal combustion engine receives an air/fuel mixture and produces heated exhaust air. The fuel device receives fresh air and provides the air/fuel mixture that is received by the internal combustion engine. The heat exchanger receives the heated exhaust air from the internal combustion engine and fresh cool air, transfers heat energy from the heated exhaust air to the fresh cool air, and provides the fresh air to the fuel device. The provided fresh air is the fresh cool air that has received the heat energy.

14 Claims, 10 Drawing Sheets

(56) References Cited

U.S. PATENT DOCUMENTS

| | | | |
|---|---|---|---|
| 3,404,733 A | 10/1968 | Pottharst | |
| 4,041,591 A | 8/1977 | Noll et al. | |
| 4,041,592 A | 8/1977 | Kelm | |
| 4,206,875 A | 6/1980 | Grasso | |
| 4,319,554 A | 3/1982 | Buffie | |
| 4,860,822 A * | 8/1989 | Sacks | F28F 1/325 |
| | | | 165/151 |
| 4,905,661 A | 3/1990 | Wilson, Jr. | |
| 5,036,907 A | 8/1991 | Leven | |
| 5,076,248 A | 12/1991 | Schatz | |
| 5,081,834 A | 1/1992 | Darragh | |
| 5,082,050 A | 1/1992 | Darragh | |
| 5,408,973 A | 4/1995 | Spangjer | |
| 5,462,113 A | 10/1995 | Wand | |
| 5,555,930 A * | 9/1996 | Lu | F28D 1/05366 |
| | | | 165/149 |
| 5,626,188 A | 5/1997 | Dewar et al. | |
| 6,029,636 A | 2/2000 | Kiel | |
| 6,164,371 A | 12/2000 | Bertilsson et al. | |
| 6,170,565 B1 | 1/2001 | Nishishita | |
| 6,267,176 B1 | 7/2001 | Bolla et al. | |
| 6,305,466 B1 | 10/2001 | Andersson et al. | |
| 6,390,186 B1 | 5/2002 | Laudic et al. | |
| 7,213,566 B1 | 5/2007 | Jankovic | |
| 7,255,157 B2 | 8/2007 | Richardson | |
| 7,360,584 B2 | 4/2008 | Hunzinger et al. | |
| 7,469,689 B1 | 12/2008 | Jones et al. | |
| 7,478,630 B2 | 1/2009 | Mauchr et al. | |
| 7,510,171 B2 | 3/2009 | Glew | |
| 7,571,718 B2 * | 8/2009 | Hendrix | F28D 7/1684 |
| | | | 123/563 |
| 7,703,505 B2 | 4/2010 | So et al. | |
| 7,703,506 B2 | 4/2010 | Brost et al. | |
| 7,748,437 B2 | 7/2010 | Rohellec | |
| 7,775,264 B2 | 8/2010 | Andersson et al. | |
| 7,946,339 B2 | 5/2011 | So et al. | |
| 8,191,615 B2 | 6/2012 | So et al. | |
| 2006/0124114 A1 | 6/2006 | Sayers et al. | |
| 2007/0251232 A1 | 11/2007 | de Kok et al. | |
| 2008/0308264 A1 * | 12/2008 | Antonijevic | F28D 1/05375 |
| | | | 165/165 |
| 2009/0260786 A1 | 10/2009 | Palanchon | |

OTHER PUBLICATIONS

International Search Report and Written Opinion dated Feb. 6, 2015 for PCT/US2014/053096.
Extended European Search Report dated Feb. 4, 2016 in European Patent Application No. 14841464.2.
International Preliminary Report on Patentability dated Mar. 8, 2016 for PCT/US2014/053096.

* cited by examiner

FUEL SYSTEM AND COMPONENTS

CROSS-REFERENCE TO RELATED APPLICATIONS

This application is a continuation of U.S. application Ser. No. 14/016,482, filed on Sep. 3, 2013, which is incorporated herein by reference in its entirety.

BACKGROUND

Fuel systems for internal combustion engines, such as those in automobiles, are typically designed to eliminate heat. This is because it is generally accepted that colder air is more dense thereby increasing fuel density and allowing for greater power generation.

Fuel may also be thermally cracked. In this approach, fuel is heated. However, past approaches require inefficient heaters to heat the fuel and there is not a commercially practical implementation available.

BRIEF SUMMARY

A fuel system according to one embodiment of the present disclosure generally includes an internal combustion engine, a fuel device and a heat exchanger. The fuel device is coupled to a fuel supply to receive fuel and is further coupled to a fresh air intake to receive fresh air therefrom. The fuel device is also coupled to the internal combustion engine to provide the air/fuel mixture to the engine, which as a result, produces heated exhaust air. The heat exchanger is coupled to the internal combustion engine to receive the heated exhaust air therefrom and transfers heat energy from the heated exhaust air to the fresh cool air, which passes through the heat exchanger on the way to the fuel device.

In another embodiment of the present disclosure, a heat exchanger includes a first portion, a second portion, a first separator, a second separator and a third separator. The first portion transfers heat energy to a first air flow from a second air flow, while the second portion transfers heat energy to the first air flow from a third air flow. The first separator is disposed between the first and second air paths, while the second separator is disposed between the first and third air paths. The third separator is disposed between the second and third air paths. A thermal conductivity of the third separator is lower than a thermal conductivity of the first or second separator.

BRIEF DESCRIPTION OF THE DRAWINGS

Embodiments are illustrated by way of example in the accompanying figures, in which like reference numbers indicate similar parts, and in which.

DETAILED DESCRIPTION

Hydrocarbons such as automotive fuel can be cracked to reduce complex organic molecules to simpler molecules. Powering an internal combustion engine with these simpler molecules can lead to increased combustion efficiency. One approach for cracking fuel is to subject it to a high temperature and may be referred to as thermal cracking. Thermal cracking has not been widely used in internal combustion engines at least in part because of difficulty in achieving the temperatures necessary to provide thermal cracking. The energy used in heating the fuel must be less than the performance gains to provide a net increase in efficiency.

Figure 1:
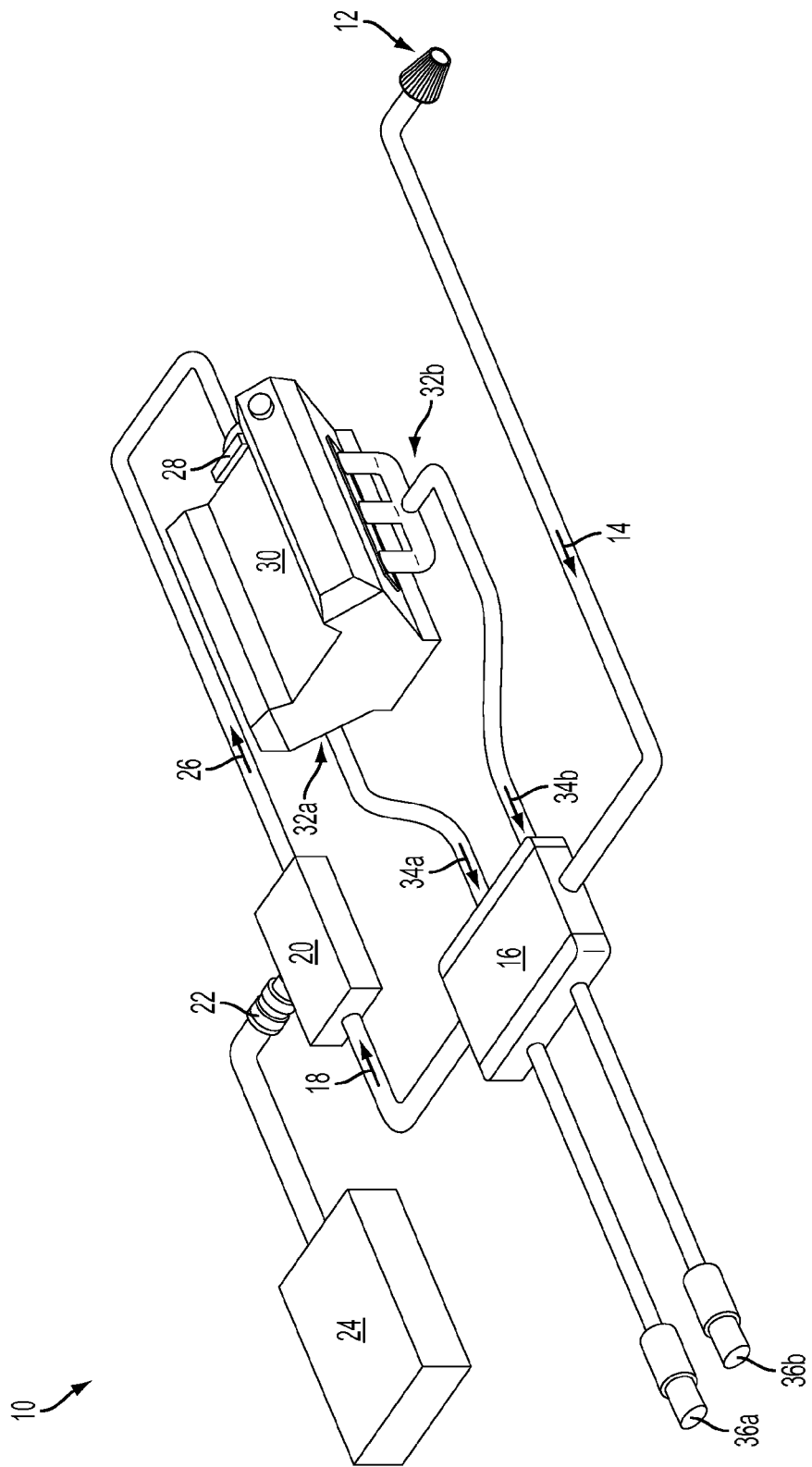
FIG. 1 is a block diagram of an exemplary fuel system.

FIG. 1 illustrates a block diagram of an exemplary fuel system according to one embodiment of the present disclosure. The fuel system 10 includes a fresh air intake 12, which may be an intake pipe or one of a variety of types of air filters. The fresh cool air, which generally refers to air taken from the ambient environment, travels via a fresh cool air path 14 to a heat exchanger 16. The heat exchanger 16 heats the incoming fresh air path 14 to provide heated fresh air to a heated fresh air path 18, which in turn, is provided to a fuel device 20. In one embodiment, the fuel device 20 may be similar to the fuel device described in U.S. Pat. No. 7,510,171, which is incorporated herein by reference. The fuel device 20 receives fuel via one or more fuel injectors 22 coupled to a fuel supply 24. Thus, the fuel device 20 transmits a heated air/fuel mixture along a heated air/fuel mixture path 26 to a throttle body 28, which may be disposed at a terminal end of the air/fuel mixture path 26. Air in the heated air/fuel mixture path 26 may include thermally cracked fuel. The throttle body 28 provides the heated air/fuel mixture to an engine 30 as combustion air. The engine 30 emits exhaust air, which travels through exhaust manifolds 32a and 32b, respectively, via the exhaust air paths 34a and 34b to the heat exchanger 16. The exhaust air provides heat energy to the heat exchanger 16, thus heating the fresh cool air path 14. The exhaust air then exits via the exhaust ports 36a and 36b. Exemplary applications of the fuel system 10 include automobiles and aircraft.

Figure 2:
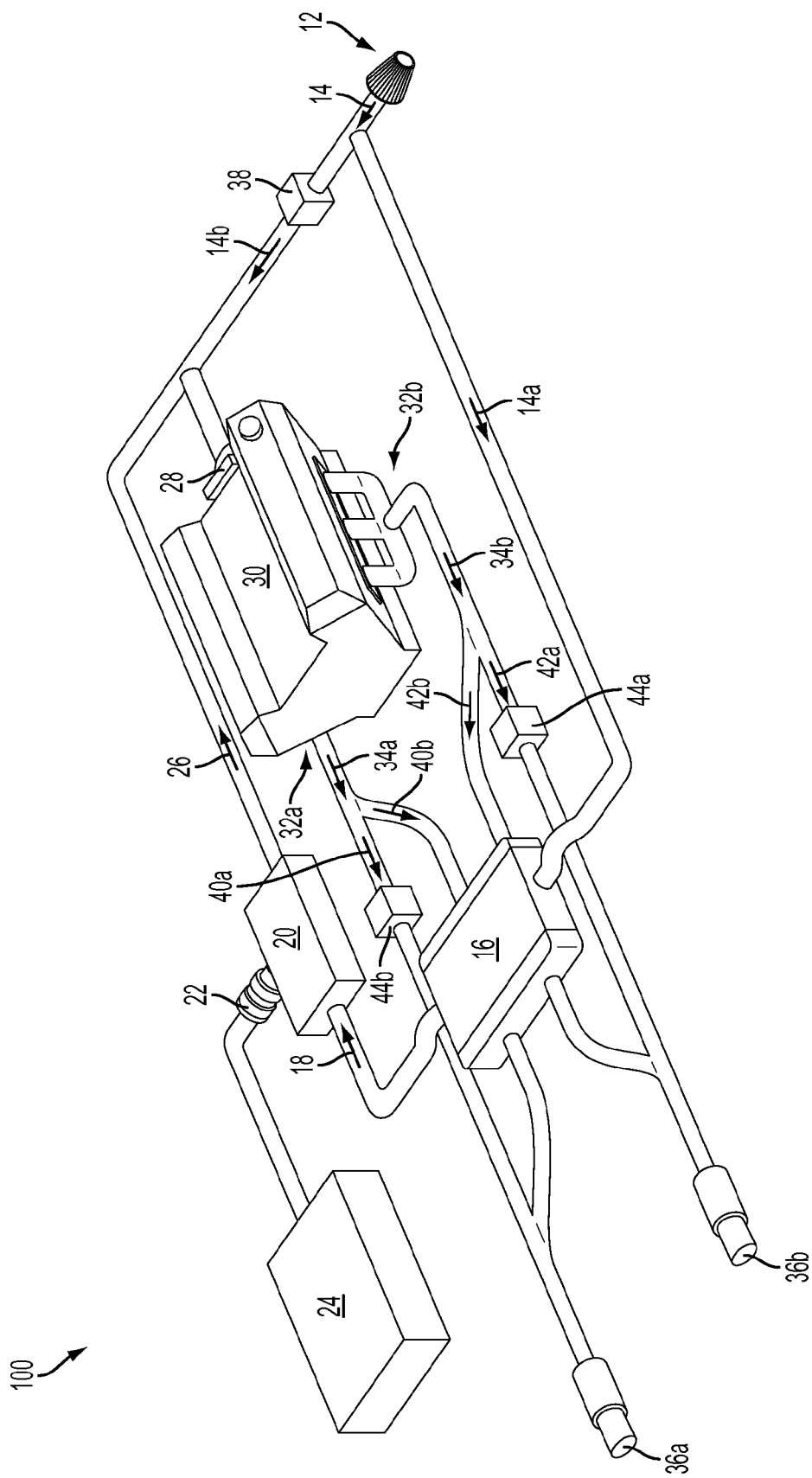
FIG. 2 is a block diagram of an exemplary fuel system.

FIG. 2 illustrates a block diagram of an exemplary fuel system 100 according to the present disclosure, which may include some components similar to those described with respect to the fuel system 10. Those similar components share common numbering with the embodiment of FIG. 1 and description thereof is omitted for brevity. The fuel system 100 includes bypass valves 38, 44a and 44b. The bypass valve 38 splits the fresh air path 14 to provide fresh air along a fresh air path 14a and cool fresh air along a cool fresh intake path 14b. The bypass valve 38 thus allows fresh cool air from the fresh air path 14 to be provided to the throttle body 28 via the cool fresh intake path 14b. Such an arrangement allows for finer control of the intake air temperature and/or the air/fuel mixture supplied to the throttle body 28. The bypass valves 44a and 44b (e.g., exhaust valves) respectively split the exhaust air paths 34a and 34b, respectively, to the bypass exhaust air paths 40a and 42a and the exhaust air paths 40b and 42b. The bypass valves 44a and 44b may thus control an amount of exhaust air provided to the heat exchanger 16 allowing a temperature of the air supplied via the heated fresh air path 18 to the fuel device 20 to be controlled and/or allowing an internal temperature of the heat exchanger 16 to be controlled to control operating temperatures and prevent an overheat condition.

Figure 3:
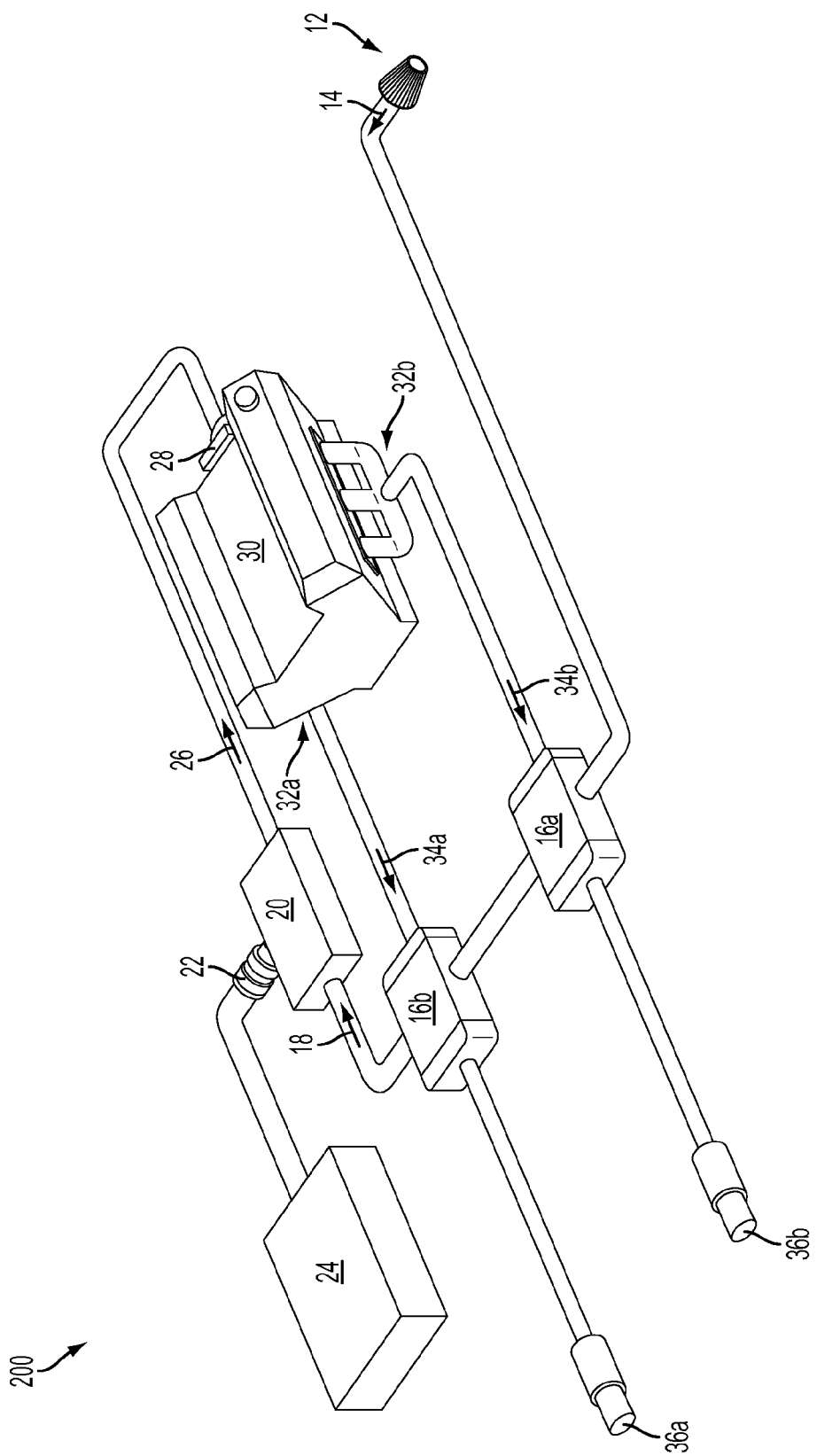
FIG. 3 is a block diagram of an exemplary fuel system.

FIG. 3 illustrates a block diagram of an exemplary fuel system 200 according to yet another embodiment of the present disclosure. The fuel system 200 includes some components similar to those described with respect to the fuel system 10. Those similar components share common numbering with the embodiment of FIG. 1 and description thereof is omitted for brevity. The fuel system 200 includes a pair of heat exchangers 16a and 16b, which correspond with the exhaust manifolds 32a and 32b, respectively. The fresh air path 14 may be provided to the heat exchangers 16a and 16b in series or in parallel to provide the heated fresh air path 18. Providing the fresh air path 14 to the heat exchanges 16a and 16b in parallel may allow for higher air temperatures in the heated fresh air path 18 and may reduce ductwork required to provide the air flow paths.

Figure 4:
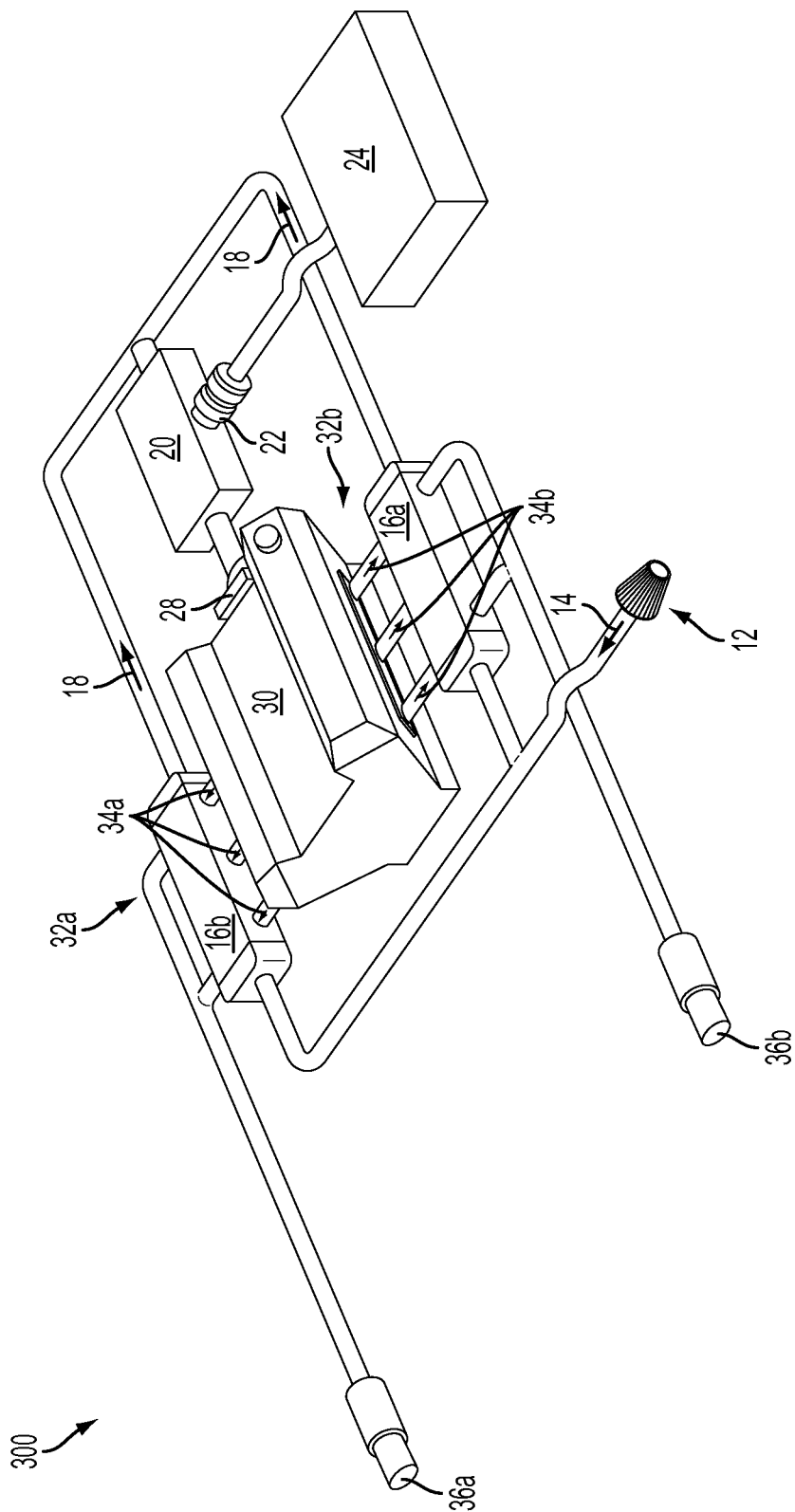
FIG. 4 is a block diagram of an exemplary fuel system.

FIG. 4 illustrates a block diagram of an exemplary fuel system 300 according to yet another embodiment of the present disclosure. The fuel system 300 includes some components similar to those described with respect to the fuel system 10. Those similar components share common numbering with the embodiment of FIG. 1 and description thereof is omitted for brevity. The fuel system 300 includes a pair of heat exchangers 16a and 16b positioned close to, adjacent to, or integrated with the exhaust manifolds 32a and 32b, respectively. Exhaust air from the cylinders of the engine 30 may be provided directly to the heat exchangers 16a and 16b before reaching a collector that combines the exhaust flow. Thus, the exhaust flow from the respective cylinders may be kept separate until combined either within the heat exchangers 16a and 16b or combined after the exhaust air passes through the heat exchangers 16a and 16b. Providing the heat exchangers 16a and 16b close to, adjacent to or integrated with the exhaust manifolds 32a and 32b may allow for higher heating of the air traveling on the heated fresh air path 18 and a more compact installation having advantages such as lower cost, easier installation, and less complicated duct work.

Figure 5:
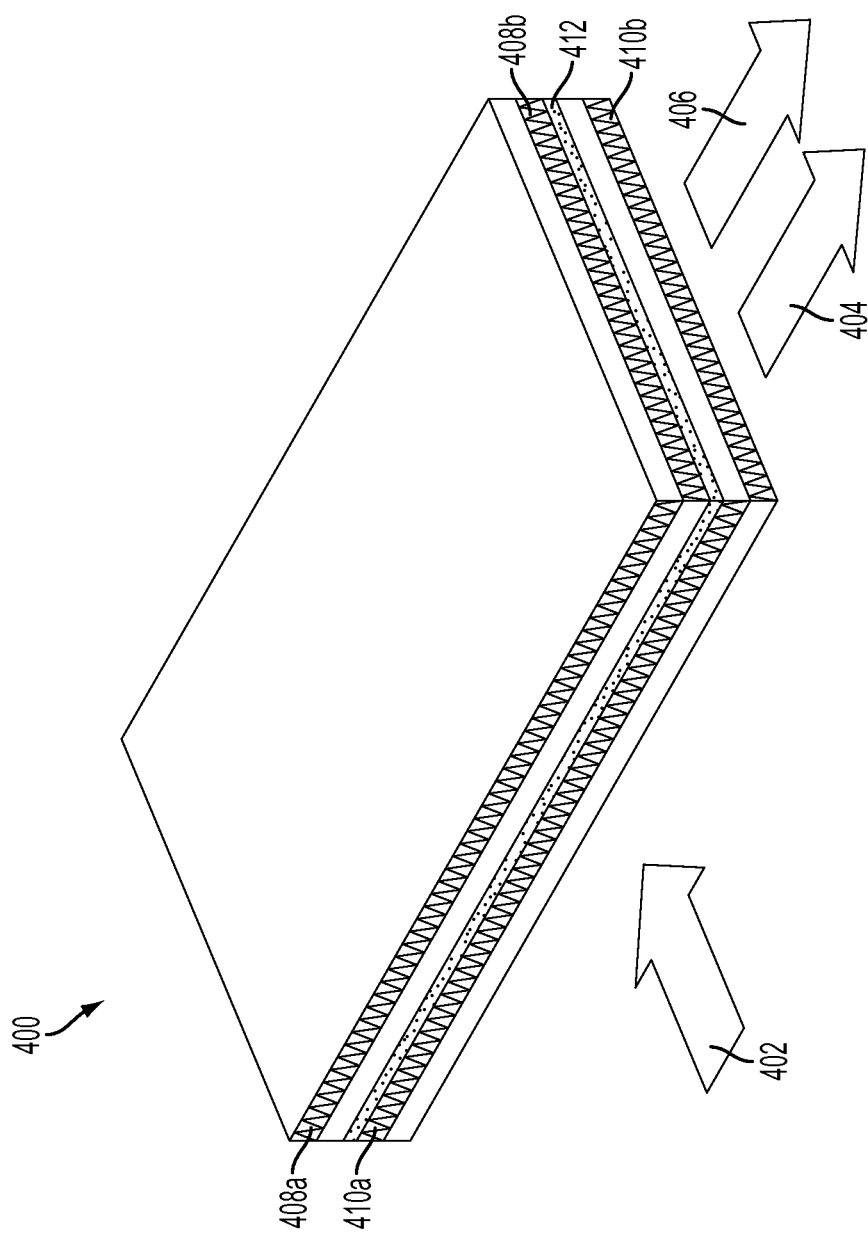
FIG. 5 is a perspective view of an exemplary heat exchanger.
Figure 6A:
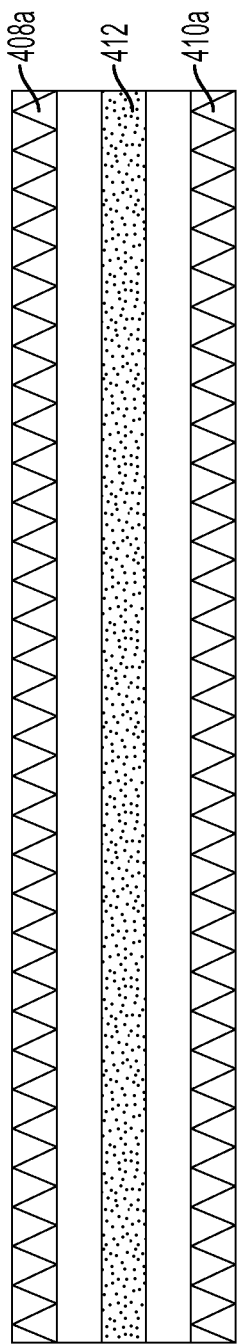
FIGS. 6A and 6B are cross-sectional views of exemplary heat exchangers.

Referring to FIGS. 5 and 6A, an exemplary heat exchanger 400 may receive a first airflow 402, a second airflow 404 and a third airflow 406. In some embodiments, the heat exchanger 400 is an example of a heat exchanger that may be used for the heat exchanger 16. The airflows 402, 404 and 406 are independent from each other and separated by separators. In some embodiments, the airflows 402, 404 and 406 may be completely isolated, and thus are respectively sealed. However, in other embodiments, there may be a small amount of cross-flow between the air flows, for example, between the airflows 404 and 406 due to manufacturing tolerances or for other purposes. In still further embodiments, the first airflow 402 is independent from each of the second airflow 404 and the third airflow 406 such that in a fuel system like the fuel system 10, there is no mixing of fresh intake air and exhaust gases.

The airflow 402 is thermally coupled to the airflows 404 and 406 by the separators 408 and 410 respectively. The separators may be provided by an undulating or corrugated thermally conductive material such as aluminum and the separators may be oriented such that air flow is not impeded. For example, the separators 408a and 410a may have surfaces that are substantially smooth in the direction of the airflow 402 and the separators 408b and 410b may have surfaces that are substantially smooth in the direction of the airflows 404 and 406.

The airflow 404 corresponds with the lower portion of the heat exchanger 400, while the airflow 406 corresponds with the upper portion of the heat exchanger 400. The airflows 404 and 406 are separated by the separator 412. The separator 412 has a lower thermal conductivity than the separators 408 and 410 and thus provides thermal insulation between the airflows 404 and 406. Indeed, the lower thermal conductivity may be provided by a thicker portion of the same material for the separator 412 as compared to the separators 408 and 410. Or the lower thermal conductivity may be provided by using a different type of the same material used for the separators 408 and 410. For example, the separators 408 and 410 may be formed of standard aluminum (e.g., 6061), whereas the separator 412 may be formed of aviation aluminum (e.g., 7075). The lower thermal conductivity may also be provided by using a different material for the separator 412 as compared to the separators 408 and 410. For example, the separator 412 may be formed of carbon steel, stainless steel, or ceramics, while the separators 408 and 410 may be formed of aluminum.

In an application such as the fuel system 10 shown in FIG. 1, the airflow 402 may correspond with a fresh air intake and the airflows 404 and 406 may correspond with exhaust air. Exhaust air temperatures can be extremely high. Accordingly, to prevent overheating, the exhaust air from each cylinder bank in an internal combustion engine may be routed through the heat exchanger 400 separately. Exhaust air flow may not be continuous, but rather may be a series of bursts of hot exhaust air. For example, a cylinder firing pattern may alternate between cylinder banks thereby providing a series of bursts of hot air to the heat exchanger 400 via the air flows 404 and 406 in an alternating pattern. Providing the exhaust flow to the heat exchanger 400 in the separate airflows 404 and 406 may therefore permit the heat exchanger to avoid an overheating condition since the portions of the heat exchanger associated with the airflows 404 and 406 are not exposed to all of the exhaust air. The heat exchanger 400 may provide heat transfer to the air flow 402 while not overheating.

Figure 6B:
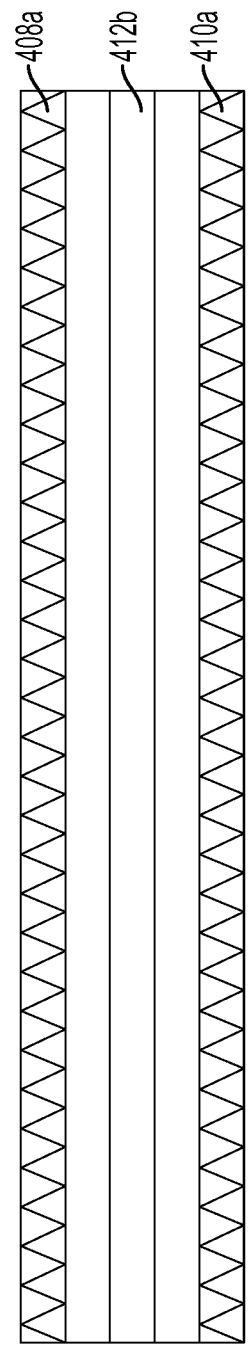

FIG. 6B illustrates a cross sectional view of an exemplary heat exchanger having an alternative separator 412b. The separator 412b may be provided by an air space. An air space, for example a sealed air space, may provide thermal insulation between the air flows 404 and 406. As another example, the separator 412b may be provided by a liquid, which may be encapsulated by or sealed in the heat exchanger 404, provided between the airflows 404 and 406.

Figure 7B:
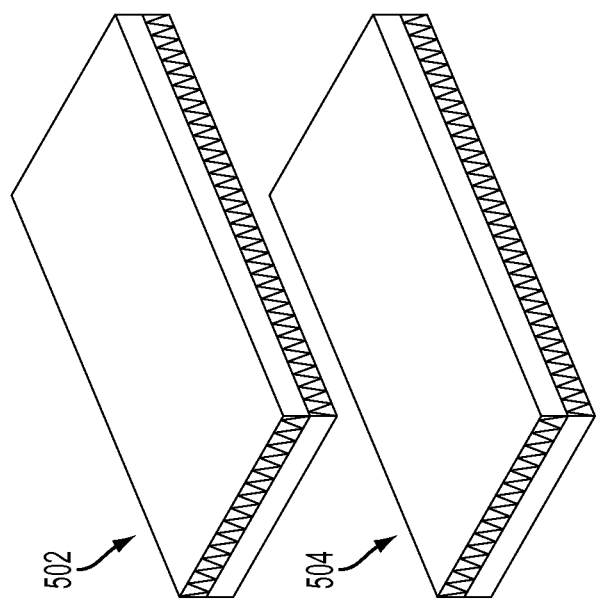
FIGS. 7A, 7B, 7C, 7D, 7E and 7F are perspective views of exemplary heat exchangers.
Figure 7A:
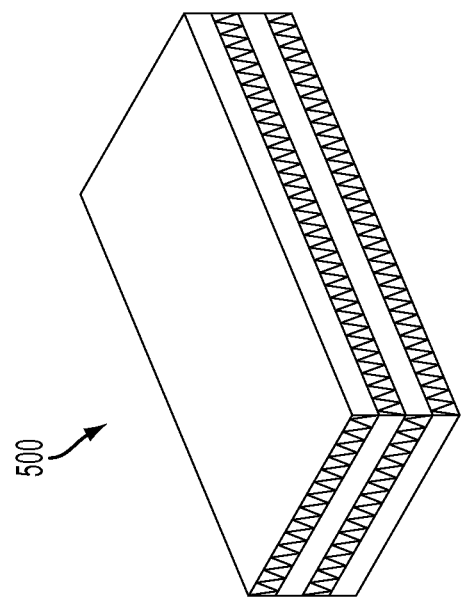
Figure 7D:
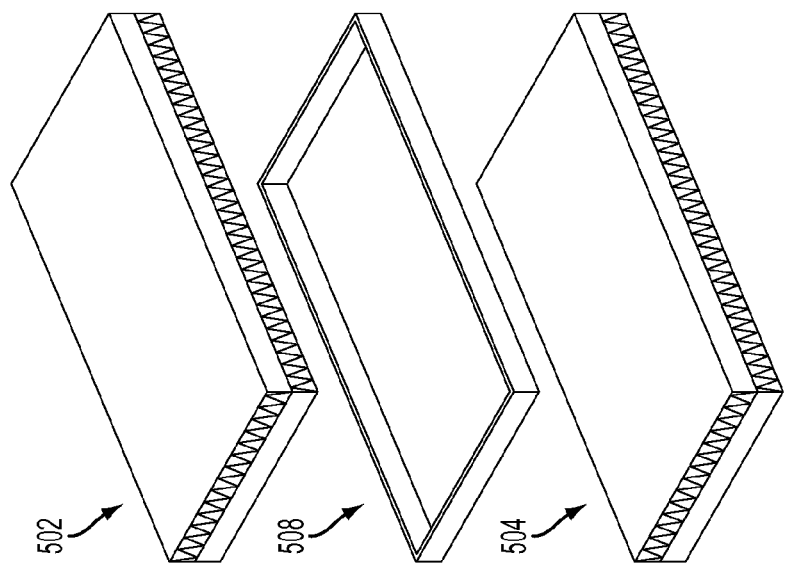
Figure 7C:
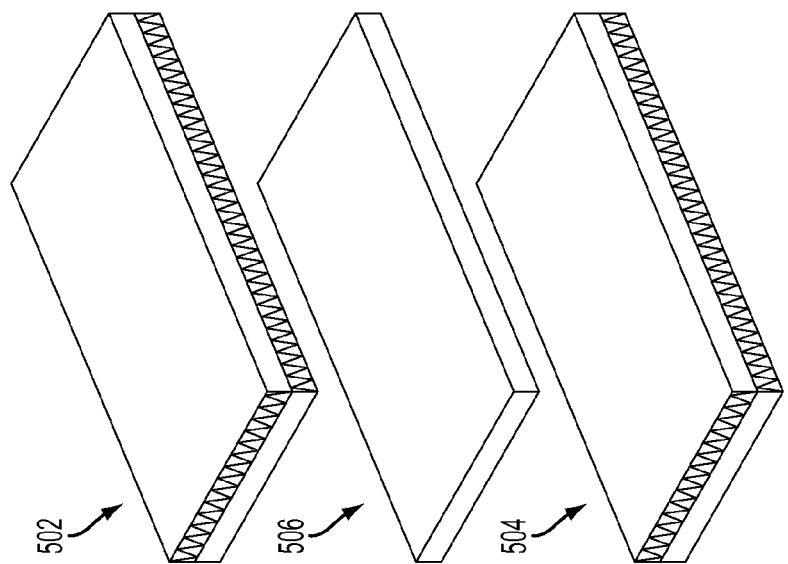
Figure 7F:
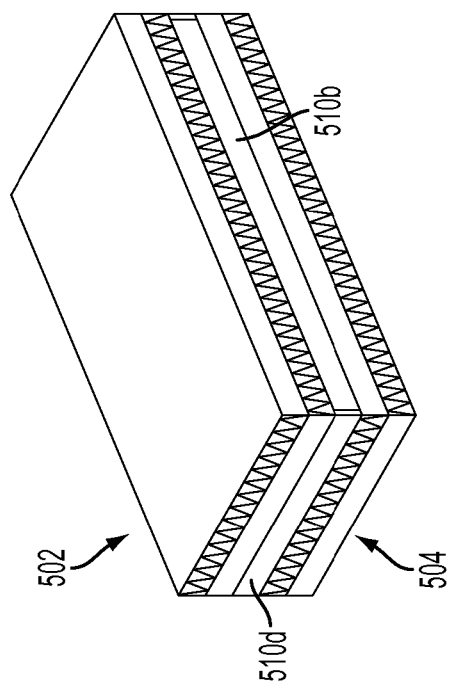
Figure 7E:
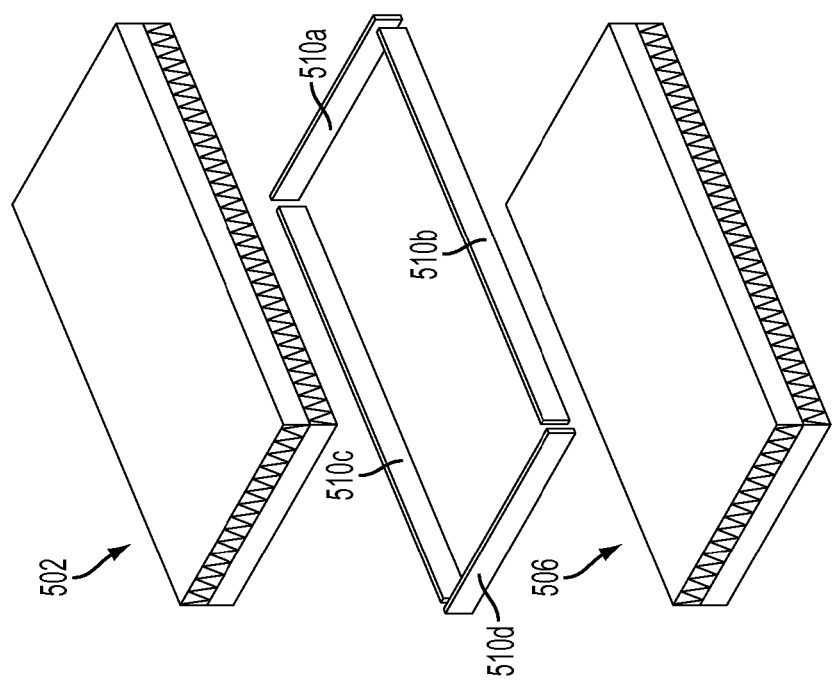

FIGS. 7A-7F illustrate exemplary process(es) for manufacturing a heat exchanger such as the heat exchanger 400. Referring to FIGS. 7A and 7B, a block of heat exchanger stock 500 is provided, which may be cut into two smaller portions 502 and 504. Alternatively, the smaller portions of heat exchanger stock 502 and 504 may be provided directly. Referring to FIG. 7C, the separator 506 having a higher thermal conductivity than separators internal to the portions 502 and 504 is disposed between the portions 502 and 504. The portions 502 and 504 may then be welded to the separator 506 to provide a heat exchanger similar to the heat exchanger 400. Alternatively, the separator 506 may not be used and the portions 502 and 504 may be welded together. In some embodiments, a top plate of the portion 504 or a bottom plate of the portion 502 may be welded to provide independent airflow and a region of a different thermal conductivity separating the portions 502 and 504. The welds may separate the portions 502 and 504 to provide separate airflows and may also seal a portion of the heat exchanger stock, thereby creating a closed airspace that provides a different thermal conductivity than in other portions of the heat exchanger stock. The weld material itself may also provide the separator. As another alternative, a spacer 508 as shown in FIG. 7D may be provided as a separator rather than plate-like separator like the separator 506. As still another alternative, external plates 510a-501d (provided as separate plates, an assembled sleeve or a partially assembled sleeve), as shown in FIG. 7E, may be secured, for example by welding, external to the portions 502 and 504. FIG. 7F illustrates an assembled heat exchanger like that in the exploded perspective view of FIG. 7E.

Figure 8:
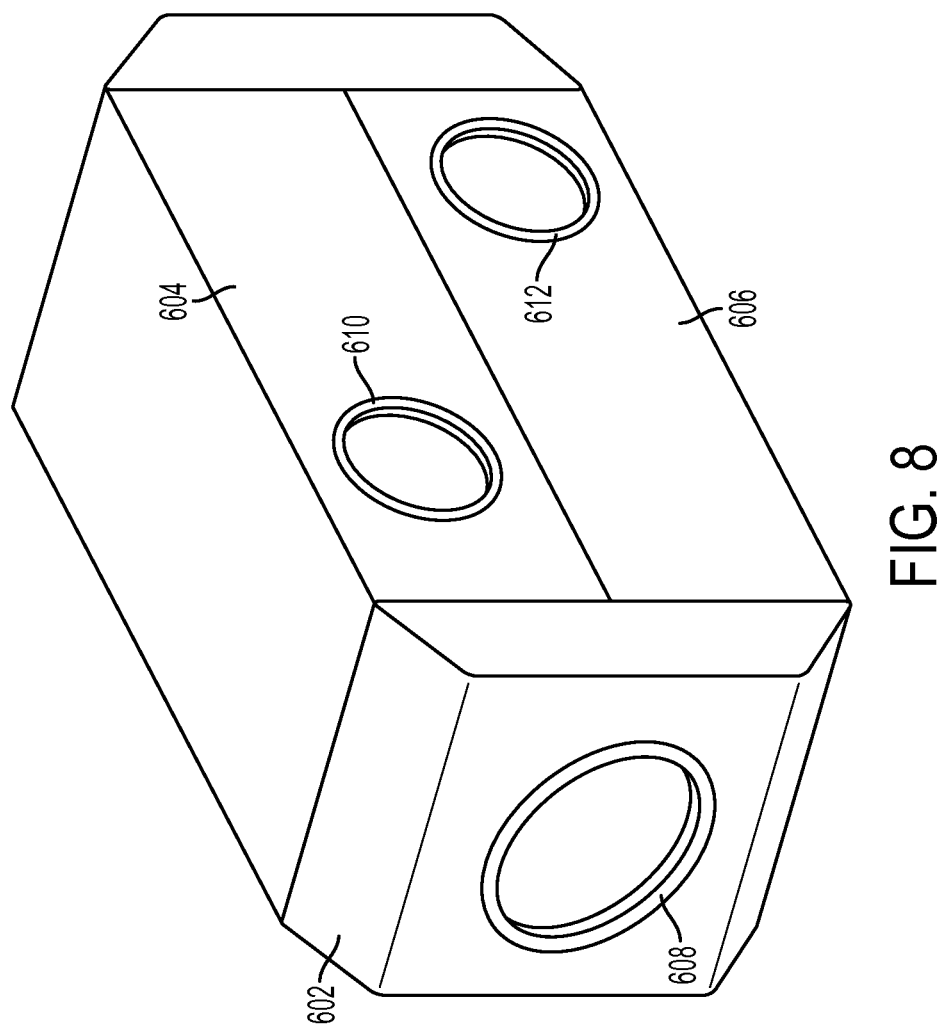
FIG. 8 is a perspective view of an exemplary heat exchanger.

Referring to FIG. 8, end caps 602, 604 and 606 may be secured, for example by welding, to the heat exchanger such as the heat exchanger 400. The end cap 602 may correspond with the air flow 402, the end cap 604 may correspond with the air flow 404 and the end cap 606 may correspond with the air flow 406. To facilitate connection within the exhaust system for an internal combustion engine, the end caps 602, 604 and 606 may respectively include the flange assemblies 608, 610 and 612. In some embodiments, the flange assemblies 608, 610 and 612 may be 2 inch v-clamp assemblies and may be welded to the end caps 602, 604 and 606.

While various embodiments in accordance with the disclosed principles have been described above, it should be understood that they have been presented by way of example only, and are not limiting. For example, although the throttle body 28 is depicted as being adjacent to the engine 30, it is to be appreciated that the throttle body may be positioned elsewhere within the fuel system, such as before the heat exchanger 16 in the embodiments of FIGS. 1 and 2 and before the heat exchangers 16a and 16b in the embodiments of FIGS. 3 and 4. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of manufacturing a heat exchanger, comprising:
   providing first and second portions of heat exchanger stock, the portions of heat exchanger stock having separators of a first thermal conductivity;
   providing a separator distinct from the portions of heat exchanger stock and having a second thermal conductivity different than the first thermal conductivity;
   disposing the separator between the first and second portions of the heat exchanger stock;
   coupling the separator to the first and second portions of the heat exchanger stock;
   coupling a first pair of end caps to the first portion of the heat exchanger stock thereby providing a first independent airflow;
   coupling a second pair of end caps to the second portion of the heat exchanger stock thereby providing a second independent airflow; and
   coupling a third pair of end caps to the first and second portions of the heat exchanger stock thereby providing a third independent airflow,
      such that the third independent airflow provides a heat transfer path respectively with each of the first and second independent airflows.

2. The method of claim 1, wherein the coupling the separator includes welding the separator to the two portions of the heat exchanger stock.

3. The method of claim 1, further comprising providing a block of heat exchanger stock, wherein the providing the first and second portions of heat exchanger stock includes cutting the block of heat exchanger stock to provide two portions.

4. The method of claim 1, wherein the separator includes a spacer.

5. The method of claim 1, wherein the separator includes a plate-shaped separator.

6. The method of claim 1, wherein at least one of the coupling the first, second or third pair of end caps includes welding the respective end caps to the portions of the heat exchanger stock.

7. The method of claim 1, wherein
   the second and third air airflows are independent and defined in a same direction through the heat exchanger stock,
   the first airflow defines a first axis,
   the second airflow defines a second axis orthogonal to the first axis,
   the third airflow defines a third axis spaced from and parallel to the second axis,
   a fourth axis is defined as normal to the first, second and third axis, and
   the first portion of the heat exchanger stock is disposed over the separator which is disposed over the second portion of the heat exchanger stock along the fourth axis.

8. A method of manufacturing a heat exchanger, comprising:
   providing first and second portions of heat exchanger stock, the first and second portions of heat exchanger stock having separators of a first thermal conductivity;
   coupling the first and second portions of the heat exchanger stock to each other such that a region of lower thermal conductivity is disposed between the two portions of the heat exchanger stock;
   coupling a first pair of end caps to the first portion of the heat exchanger stock thereby providing a first independent airflow;
   coupling a second pair of end caps to the second portion of the heat exchanger stock thereby providing a second independent airflow; and
   coupling a third pair of end caps to the first and second portions of the heat exchanger stock thereby providing a third independent airflow,
      such that the third independent airflow provides a heat transfer path respectively with each of the first and second independent airflows.

9. The method of claim 8, wherein the coupling includes welding the two portions of the heat exchanger stock such that an air space is defined between the two portions of the heat exchanger stock.

10. The method of claim 8, further comprising providing a block of heat exchanger stock, wherein the providing the first and second portions of heat exchanger stock includes cutting the block of heat exchanger stock to provide two portions.

11. The method of claim 8, further comprising providing a separator disposed between the first and second portions of the heat exchanger stock before the coupling.

12. The method of claim 8, wherein
the second and third air airflows are independent and defined in a same direction through the heat exchanger stock,
the first airflow defines a first axis,
the second airflow defines a second axis orthogonal to the first axis,
the third airflow defines a third axis spaced from and parallel to the second axis,
a fourth axis is defined as normal to the first, second and third axis, and
the first portion of the heat exchanger stock is disposed over the region of lower thermal conductivity which is disposed over the second portion of the heat exchanger stock along the fourth axis.

13. A method of installing a heat exchanger in a vehicle, comprising:
providing the heat exchanger, the heat exchanger having:
a first and second portion of heat exchanger stock;
a separator disposed between the first and second portions of heat exchanger stock;
a first pair of end caps coupled to the first portion of the heat exchanger stock thereby providing a first independent airflow,
a second pair of end caps coupled to the second portion of the heat exchanger stock thereby providing a second independent airflow, and
a third pair of end caps coupled to the first and second portions of the heat exchanger stock thereby providing a third independent airflow,
such that the third independent airflow provides a heat transfer path respectively with each of the first and second independent airflows;
providing a vehicle having an internal combustion engine, the engine having an air intake and two exhaust outputs;
coupling the first and second pairs of end caps to respective exhaust outputs of the engine; and
coupling the third pair of end caps between an air filter and the air intake of the engine.

14. The method of claim 13, wherein
the second and third air airflows are independent and defined in a same direction through the heat exchanger stock,
the first airflow defines a first axis,
the second airflow defines a second axis orthogonal to the first axis,
the third airflow defines a third axis spaced from and parallel to the second axis,
a fourth axis is defined as normal to the first, second and third axis, and
the first portion of the heat exchanger stock is disposed over the second portion of the heat exchanger stock along the fourth axis.

* * * * *